(12) United States Patent
Zhang

(10) Patent No.: US 10,438,193 B2
(45) Date of Patent: Oct. 8, 2019

(54) TRANSACTION PROCESSING METHOD AND APPARATUS

(71) Applicant: Xiaoxiong Zhang, Shanghai (CN)

(72) Inventor: Xiaoxiong Zhang, Shanghai (CN)

(73) Assignee: Xiaoxiong Zhang, Shanghai (CN)

( * ) Notice: Subject to any disclaimer, the term of this patent is extended or adjusted under 35 U.S.C. 154(b) by 840 days.

(21) Appl. No.: 13/975,389

(22) Filed: Aug. 26, 2013

(65) Prior Publication Data

US 2015/0058218 A1    Feb. 26, 2015

(51) Int. Cl.
*G06Q 40/00*    (2012.01)
*G06Q 20/34*    (2012.01)

(52) U.S. Cl.
CPC .................. *G06Q 20/352* (2013.01)

(58) Field of Classification Search
CPC .. G06Q 20/12; G06Q 20/0855; G06Q 20/085; G06Q 20/28; G06Q 20/29
USPC .......................................................... 705/44
See application file for complete search history.

(56) References Cited

U.S. PATENT DOCUMENTS

| | | | | |
|---|---|---|---|---|
| 2001/0056395 | A1* | 12/2001 | Khan | G06Q 20/00 705/37 |
| 2002/0052841 | A1* | 5/2002 | Guthrie | G06Q 20/04 705/40 |
| 2002/0073008 | A1 | 6/2002 | Dutta et al. | |
| 2003/0078897 | A1* | 4/2003 | Florance | G06Q 10/087 705/80 |
| 2003/0233311 | A1* | 12/2003 | Bramnick | G06Q 30/0601 705/37 |
| 2006/0020783 | A1* | 1/2006 | Fisher | G06Q 20/02 713/156 |
| 2008/0103987 | A1* | 5/2008 | Bocheck | G06Q 30/08 705/80 |
| 2009/0212922 | A1* | 8/2009 | Hong | H04Q 9/00 340/10.6 |
| 2011/0066524 | A1* | 3/2011 | Bottner | G06Q 20/085 705/26.41 |

FOREIGN PATENT DOCUMENTS

| | | |
|---|---|---|
| CN | 102281462 A | 12/2011 |
| CN | 103154986 A | 6/2013 |

OTHER PUBLICATIONS

XML Relational Database,1997, https://web.archive.org/web/19970605080304/https://www.w3.org/XML/RDB.html (Year: 1997).*

(Continued)

*Primary Examiner* — Bruce I Ebersman
*Assistant Examiner* — Mark H Gaw
(74) *Attorney, Agent, or Firm* — Jun He Law Offices P.C.; James J. Zhu

(57) ABSTRACT

The present disclosure relates to a transaction processing method and apparatus. The method comprises: reading a tag via a user device t obtain a provide identifier associated with a provider for a transaction; generating via the user device a user request containing the provider identifier and a user identifier associated with a user for the transaction; and transmitting the user request to a transaction server, wherein a provider request containing transaction information and the provider identifier has been sent to the transaction server and stored therein.

26 Claims, 7 Drawing Sheets

(56) References Cited

OTHER PUBLICATIONS

A Relation Database Structure for Life Cycle Assessments, 1995, https://pdfs.sennanticscholar.org/e8df/065db363c5bd27b890d64d9f161218e17a92.pdf (Year: 1995).*

Databases in Healthcare, 1980, Stanford Computer Science Department Report No. STAN-CS-80-790, http://infolab.stanford.edu/pub/gio/1980/CS-TR-80-790.pdf. (Year: 1980).*

Bakos, Yannis (The Emerging Role of Electronic Marketplaces on the Internet, Communications of the ACM, http://citeseerx.ist.psu.edu/viewdoc/download?doi=10.1.1.83.180&rep=rep1&type=pdf Aug. 1998) (Year: 1998).*

International Preliminary Report on Patentability for PCT/CN2013/082263.

\* cited by examiner

| Provider Request Datasheet 70 | | |
|---|---|---|
| Provider Identifier 71 | Transaction Information 72 | Time of Receipt 73 |
| PID001 | $5.00 to be paid | 11:20  01/02/2013 |
| PID002 | $20.00 to be paid | 11:23  01/02/2013 |
| PID003 | $ 30.00 to be refunded | 11:55  01/02/2013 |
| ... | ... | ... |

| Provider Request Datasheet 80 |||||
|---|---|---|---|
| Provider Identifier 81 | Transaction Information 82 | Time of Receipt 83 | User Identifier 84 |
| PID001 | $5.00 to be paid | 11:20  01/02/2013 | UID001 |
| PID002 | $20.00 to be paid | 11:23  01/02/2013 | UID002 |
| PID002 | $ 10.00 has been paid | 11:15  01/02/2013 | UID003 |
| ... | ... | ... | ... |

Fig. 4b

| Provider Request Datasheet 90 |||||
|---|---|---|---|---|
| Provider Identifier 91 | Transaction Information 92 | Time of Receipt 93 | User Identifier 94 | Location 95 |
| PID001 | $5.00 to be paid | 11:20  01/02/2013 | UID001 | 14, Shanghai Rd. |
| PID002 | $20.00 to be paid | 11:23  01/02/2013 | UID002 | 245, Nanjing Rd. |
| PID002 | $ 10.00 has been paid | 11:15  01/02/2013 | UID003 | 245, Nanjing Rd. |
| ... | ... | ... | ... | ... |

Fig. 4c

TRANSACTION PROCESSING METHOD AND APPARATUS

TECHNICAL FIELD

The present disclosure generally relates to electronic transaction technology, and more particularly relates to a transaction processing method and apparatus, and a computer readable storage medium.

BACKGROUND

Nowadays, credit cards, bankcards and charge cards have been widely used in various transactions such as paying for purchase of commodities or services, or transferring funds between accounts associated with the cards. The transactions can be conducted through use of an automated teller machine (ATM) or a point of sale (POS) machine having access to a bank network or other transaction networks. However, in places where no ATM or POS machines are deployed or in cases when people do not carry their cards, such transaction cannot be easily conducted.

With the rapid popularization of smart phones and other wireless communication devices, mobile payment becomes an effective method to settle the absence of ATM or POS machines. For example, a portable card reader capable of reading account information from the credit cards may be coupled to the smart phone to provide the account information thereto. The smart phone then processes the account information and communicates such information with the external transaction network to act as the POS device. However, for such mobile payment, it is required for one party of the transaction to verify his or her personal identifying information (PIN) on the device of the other party involved in the transaction, which significantly increases the risk of credit card fraud.

Therefore, there is a need for an approach for processing transactions easily and safely.

SUMMARY OF THE INVENTION

One aspect of the present disclosure relates to methods for processing transactions more easily and safely.

In certain embodiments, the present disclosure provides a transaction processing method. The method comprises the steps of: reading a tag via a user device to obtain a provide identifier associated with a provider for a transaction; generating via the user device a user request containing the provider identifier and a user identifier associated with a user for the transaction; and transmitting the user request to a transaction server, wherein a provider request containing transaction information and the provider identifier has been sent to the transaction server and stored therein.

In certain embodiments, the method further comprises: receiving a server response informing the status of the transaction, wherein the server response is generated via the transaction server by matching the user request and the provider request through the provider identifier; and presenting the server response via the user device.

In certain embodiments, the method further comprises: receiving a server request containing the transaction information after the matching of the user request and the provider request; generating a user response in answer to the server request by taking a user action by the user regarding the transaction information via the user device; and transmitting the user response to the transaction server to complete the transaction between the user and the provider.

In certain embodiments, the method further comprises: receiving a server response informing the status of the transaction, wherein the server response is generated via the transaction server by matching the user request and the provider request through the provider identifier and the user identifier; and presenting the server response via the user device.

In certain embodiments, the present disclosure provides a transaction processing method. The method comprises: receiving a provider request containing transaction information and a provider identifier associated with a provider; receiving a user request from a user device, wherein the user request contains the provider identifier and a user identifier associated with a user; and matching the user request with the provider request through the provider identifier to conduct the transaction between the user and the provider.

In certain embodiments, the step of matching the user request with the provider request further comprises: transmitting a transaction request containing the transaction information and information related to the provider and the user to an application server for conducting the transaction between the user and the provider; receiving a transaction response indicating whether or not the transaction is completed from the application server.

In certain embodiments, the method further comprises: generating a server response indicating the status of the transaction; and transmitting the server response to the user device and/or a provider device associated with the provider.

In certain embodiments, the method further comprises: generating the a server request containing the transaction information after the matching of the user request and the provider request; transmitting the server request to the user device; and receiving a user response in answer to the server request to complete the transaction between the user and the provider, wherein the user response is generated via the user device by taking a user action by the user regarding the transaction information.

Another aspect of the present disclosure relates to apparatus for processing transactions more easily and safely.

In certain embodiments, the present disclosure provides a transaction processing apparatus. The apparatus comprises a tag reader configured to read a tag to obtain a provider identifier associated with a provider for a transaction; a control module configured to generate a user request containing the provider identifier and a user identifier associated with a user; and a communication module configured to transmit the user request to a transaction server, wherein a provider request containing transaction information and the provider identifier has been sent to the transaction server and stored therein.

In certain embodiments, the present disclosure provides a transaction processing apparatus. The apparatus comprises a transaction portal configured to receive a provider request containing transaction information and a provider identifier associated with a provider for a transaction, and to receive a user request from a user device, wherein the user request contains the provider identifier and a user identifier associated with a user; and a processing module configured to match the user request with the provider request through the provider identifier to conduct the transaction between the user and the provider.

In certain embodiments, the apparatus further comprise a distribution gateway configured to transmit a transaction request containing the transaction information and information related to the provider and the user to an application server for conducting the transaction between the user and the provider, and to receive a transaction response indicating whether or not the transaction is completed from the application server.

A further aspect of the present disclosure relates to computer readable storage mediums.

In certain embodiments, the present disclosure provides a computer readable storage medium for storing a program of instructions executable by a computer to perform a process. The process comprises: reading a tag via a user device to obtain a provider identifier associated with a provider for a transaction; generating via the user device a user request containing the provider identifier and a user identifier associated with a user; and transmitting the user request to a transaction server, wherein a provider request containing transaction information and the provider identifier has been sent to the transaction server and stored therein.

In certain embodiments, the process further comprises: receiving a server response informing the status of the transaction, wherein the server response is generated via the transaction server by matching the user request and the provider request through the provider identifier; and presenting the server response via the user device.

In certain embodiments, the present disclosure provides a computer readable storage medium for storing a program of instructions executable by a computer to perform a process. The process comprises: receiving a provider request containing transaction information and a provider identifier associated with a provider for a transaction; receiving a user request from a user device, wherein the user request contains the provider identifier and a user identifier associated with a user; and matching the user request with the provider request through the provider identifier to conduct the transaction between the user and the provider.

In certain embodiments, the process further comprises: transmitting a transaction request containing the transaction information and information related to the provider and the user to an application server for conducting the transaction between the user and the provider; and receiving a transaction response indicating whether or not the transaction is completed from the application server.

In certain embodiments, the process further comprises: generating a server response indicating the status of the transaction; and transmitting the server response to the user device and/or a provider device associated with the provider.

The foregoing has outlined features of the present disclosure. Additional features of the present disclosure will be described, hereinafter, which form the subject of the claims of the present disclosure. It should be appreciated by those skilled in the art that the conception and specific embodiments disclosed herein may be readily utilized as a basis for modifying or designing other structures or processes for carrying out the objectives of the present disclosure. It should also be realized by those skilled in the art that such equivalent constructions do not depart from the spirit and scope of the present disclosure as set forth in the appended claims.

BRIEF DESCRIPTION OF THE DRAWINGS

The aforementioned features and other features of the disclosure will be further described in the following paragraphs by referring to the accompanying drawings and the appended claims. It will be understood that, these accompanying drawing merely illustrate some embodiments in accordance with the present disclosure and should not be considered as limitation to the scope of the present disclosure. Unless otherwise specified, the accompanying drawings need not be proportional, and similar reference characters generally denote similar elements.

FIG. 3 shows an exemplary diagram of the transaction server 40 in FIG. 1, according to an embodiment of the present disclosure;

FIG. 4a-4c show exemplary request datasheets according to an embodiment of the present disclosure;

DETAILED DESCRIPTION OF ILLUSTRATIVE EMBODIMENTS

The following detailed description refers to the accompanying drawings as a part of the present disclosure. The illustrative embodiments described in the detailed description, the accompanying drawings and the claims are not limiting, and other embodiments may be adopted, or modifications may be made without deviating from the spirit and subject of the disclosure. It should be understood that, the various aspects of the disclosure described and graphically presented herein may be arranged, replaced, combined, divided and designed in many different configurations, and these different configurations are implicitly included in the disclosure.

In the following paragraphs, some specific terms will be used to clearly describe the illustrative embodiments. However, the intent of using these terms is not to limit the scope of protection of this disclosure, the scope of these terms should extend to any equivalent replacements that achieve substantially the same objective in substantially the same way.

Figure 1:
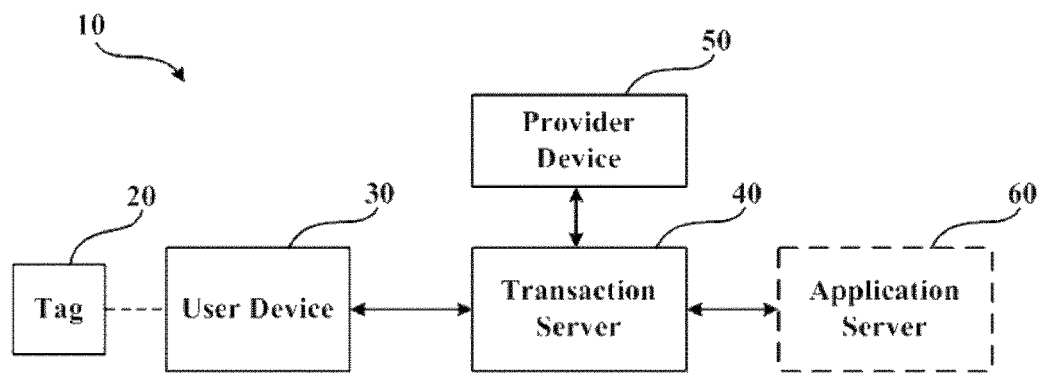
FIG. 1 shows a diagram of a transaction system capable of conducting a transaction between a provider and a user according to an embodiment of the present disclosure.

FIG. 1 shows a diagram of a transaction system 10 capable of conducting a transaction between a provider and a user according to an embodiment of the present disclosure. The transaction system 10 utilizes a tag 20 associated with the provider to set up a "virtual connection" between the provider and the user to conduct the transaction therebetween. The tag 20 is a short-range wireless communication technology that enables data exchange between devices over short distances. The tag 20 is an integrated circuit chip packaged with an antenna, which is generally small in size. In certain embodiments, the tag 20 may be disposed on a POS machine, an ATM machine, an identity (ID) card, a financial card such as a magnetic strip card or a credit card, a table, a shelf, a package of commodity, a catalog or a menu associated with the provider. Such configured, the user could be well notified of the relationship between the tag 20 and the provider in terms of the position of the tag 20. In certain embodiments, an instruction or description note indicating use of the tag 20 may be arranged near the tag 20.

In certain embodiments, the tag 20 may be a near field communication (NFC) tag, a radio frequency identification (RFID) tag, a contactless card, or any combination thereof that contains information for identifying the provider, for example, a provider identifier generally comprised of a series of characters, numbers or the like. These electronic tags are generally required to be read by specific electronic readers to obtain the identifying information or other information stored therewithin. Therefore, the transaction utilizing such tags is safe to the transaction parties, especially compared with the bar code tags. Preferably, the tag 20 also stores a provider account associated with the provider, which may be read from the tag 20 along with the provider identifier. It is contemplated that, the tag 20 may store additional provider-related or transaction-related information, such as the transaction restrictions, the location of the provider or the like.

The tag 20 may be a passive tag or an active tag. The passive tag is only activated when is within the range of the tag reader. The tag reader emits a low-power radio wave field that can be collected by the tag 20, such that the circuit in the tag 20 can operate to transmit the stored information to the tag reader. Different from the passive tag, the active tag has integrated an inner power source for supplying its own circuit. Accordingly, the active tag may enable additional functions such as programmable and encryption capabilities.

As shown in FIG. 1, the transaction system 10 comprises a user device 30 and a transaction server 40 operatively coupled to each other, for example, via a wired or wireless communication. It is contemplated that the wired communication may be a cable or fiber-optic communication. The wireless communication may be a cellular network employing suitable technologies such as enhanced data rates for global evolution (EDGE), general packet radio service (GPRS), global system for mobile communications (GSM), Internet protocol multimedia subsystem (IMS), universal mobile telecommunication system (UMTS), as well as any other suitable wireless medium such as microwave access (WiMAX), long term evolution (LTE) networks, code division multiple access (CDMA), wireless fidelity (WiFi), satellite and the like.

The user device 30 may be any type of mobile terminal, fixed terminal, or portable terminal including cell phones, smart phones, laptops, computers, pad, personal digital assistants, game players, electronic watches, electronic glasses, wearable devices or any other electronic devices with data processing capability. The user device 30 may have a remote communication module for communication with the transaction server 40. In certain embodiments, a tag reader may be integrated within or operatively coupled to the user device 30, to read the information stored within the tag 20, such as the provider identifier. For example, the tag reader may be a NFC reader, a RFID reader, a contactless card reader or the like. The tag reader generally has a transmitter, a receiver, a control unit and an antenna. The transmitter and the receiver (or a transceiver) can exchange data or information with the tag 20 via its antenna. The control unit is used for controlling the data exchange under instruction(s) from a higher control level of the user device 30. The control unit also demodulates and decodes an analog signal carrying the tag-stored information from the tag 20, such that the tag-stored information can be identified and processed by the user device 30. In certain embodiments, the tag 20 may utilize certain encryption algorithm to encrypt the stored information. Accordingly, the user device 30 may further have a decryption module to decrypt the encryption information, such as to further improve the security of the transaction.

Figure 2:
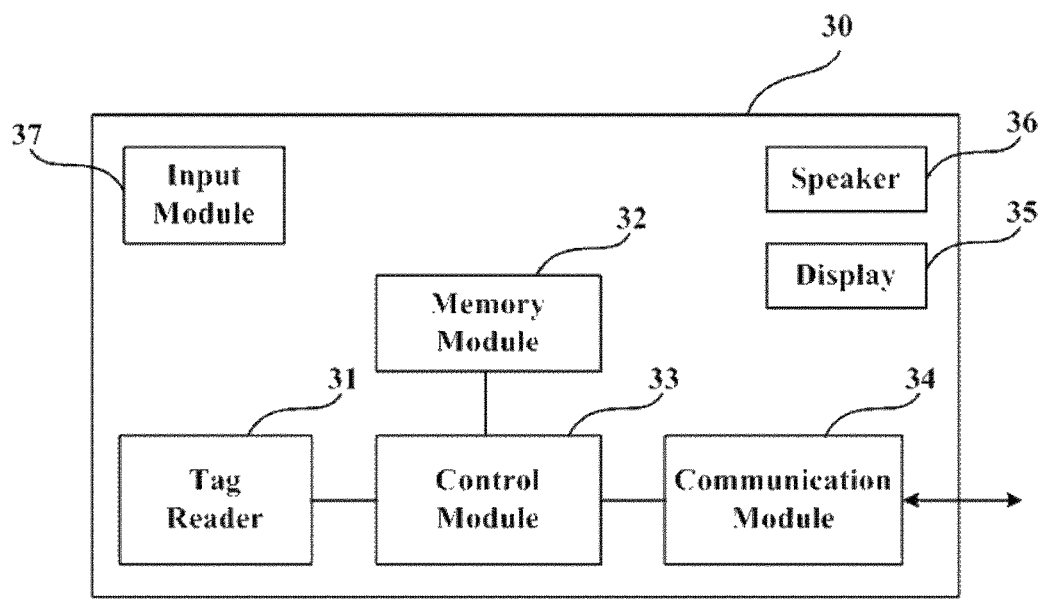
FIG. 2 shows an exemplary diagram of the user device 30 in FIG. 1, according to an embodiment of the present disclosure.

FIG. 2 shows an exemplary diagram of the user device 30 in FIG. 1, according to an embodiment of the present disclosure.

As shown in FIG. 2, the user device 30 has a tag reader 31 for reading the tag. The tag reader 31 may be internally integrated within the user device 30, or external to the user device and coupled to the user device 30 via a digital or analogue signal connection such as an audio interface or a USB interface. The user device 30 also has a memory module 32 and a control module 33. The memory module 32 stores a user identifier for identifying the identity of the user. The control module 33 obtains the provider identifier read from the tag and the user identifier stored within the memory module 32, and then generates a user request according to the identifiers. The control module 33 may also process other requests or instructions during the transaction to allow the user device 30 to interact with the transaction server 40 in FIG. 1 via a communication module 34. In certain examples, the user device 30 may also have a display module 35 and/or a speaker 36. The displaying module 35 and the speaker 36 are capable of presenting information relevant to the status and proceedings of the transaction to the user. Furthermore, the user device 30 may include an input module 37 such as a keyboard or a touch screen for receiving entry of the user.

Still referring to FIG. 1, the transaction server 40, which serves as an intermediary between the provider and the user, stores one or more provider requests that have been sent to the transaction server 40 by the provider, for example, via a provider device 50. The provider device 50 may be any type of mobile terminal, fixed terminal, or portable terminal having connectivity to the transaction server 20, which includes POS machines, cell phones, smart phones, laptops, computers, pad devices, personal digital assistants, game players or any other electronic devices capable of receiving entry of transaction information or generating the transaction information. In certain embodiments, the transaction information may comprise an amount of payment to be paid from the user to the provider, or an amount or refundment to be transferred from the provider to the user. Accordingly, the transaction between the user and the provider is a payment. In certain embodiments, the transaction information may comprise a receipt of payment, which indicates that the payment has already been paid from the user to the provider. Accordingly, the transaction between the user and the provider is service or commodity exchange on basis of the receipt of payment. In certain embodiments, the transaction information may comprise information that the provider wants to show to the user, such as commodity information, service information or the like. The transaction information may be entered into the provider device 50 by the provider, or otherwise obtained by the provider device 50. For example, the provider device 50 may scan a commodity or service bar code to obtain the transaction information, which may include the price information about the commodity or service. The provider device 50 may also search for the transaction information in a database to generate the provider request containing such transaction information.

Furthermore, the provider device 50 is capable of obtaining the provider identifier associated with the provider, which is stored within the provider device 50, for example. The provider device 50 further generates the provider request according to the transaction information and the provider identifier, and transmits the provider request to the transaction server 40.

As described above, the transaction server 40 stores the provider request that is provided by the provider and sent from the corresponding provider device 50. It is contemplated that one provider may provide several provider requests by using one or more provider devices. Furthermore, a plurality of provider requests provided by various providers may form a database or datasheet indexed by the provider identifiers. Accordingly, the transaction server 40 can identify the provider requests and search for the corresponding request when it is required by the transaction.

In certain embodiments, the transaction server 40 may store additional information necessary for completing the transaction. For example, where the transaction is a payment and the transaction information includes the amount of payment to be paid from the user to the provider, the transaction server 40 may further store a user account associated with the user and/or the provider account associated with the provider. Thus, the transaction server 40 may directly process the transaction by internally transferring funds corresponding to the amount of payment from the user account to the provider account. In certain embodiments, some information necessary for the transaction may be stored within an application server 60 separate from and operatively coupled to the transaction server 40, for example, a bank or financial server. The application server 60 may contain application-specific data required for the transaction, such as account information associated with the provider and the user. The application may be operated by the provider or a third party. Accordingly, the transaction server 40 may generate a transaction request containing the transaction information and the account information, and then transmit the transaction request to the application server 60 for conducting the transaction there. The transaction server 40 then receives a response from the application server 60, which informs the status of the transaction.

Figures 3, 4A:
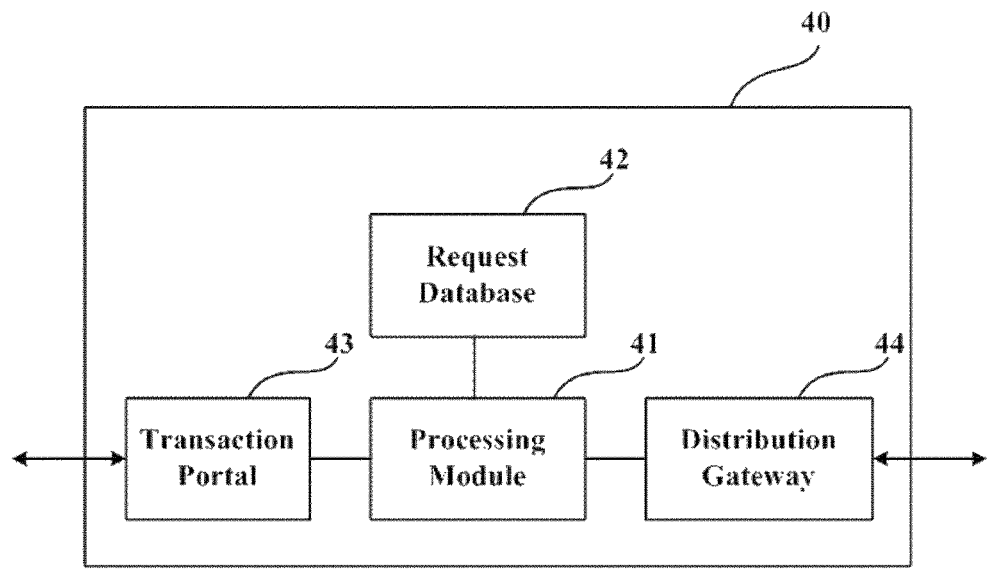

FIG. 3 shows an exemplary diagram of the transaction server 40 in FIG. 1, according to an embodiment of the present disclosure.

As shown in FIG. 3, the transaction server 40 has a transaction processing module 41, a request database 42, a transaction portal 43 and a distribution gateway 44. The transaction processing module 41 interacts requests, responses and other data with the user device 30 and provider device 50 in FIG. 1 via the transaction portal 43. The request database 42 is used to store provider requests sent from provider devices. The provider requests stored within the request database 42 may be provided by various providers, therefore the request database 42 may include a datasheet indexed by the provider identifiers. The distribution gateway 44 may interact with the external application server to conduct the transaction.

FIG. 4a shows an exemplary request datasheet stored within the request database 42 in FIG. 3, according to an embodiment of the present disclosure.

As shown in FIG. 4a, the request datasheet 70 has three columns. A first column 71 represents the provider identifier for identifying different providers. A second column 72 represents the transaction information contained within the provider requests, such as "$5.00 to be paid" or "$30.00 to be refunded" or the like. A third column 73 represents the time of receipt of the provider requests. In certain examples, the request datasheet 70 may have multiple provider requests with the same provider identifier. Then the transaction server may process the multiple provider requests in order of time of receipt.

FIGS. 4b and 4c show two other exemplary datasheets stored within the request database 42 in FIG. 3, according to an embodiment of the present disclosure.

As shown in FIG. 4b, the datasheet 80 in FIG. 4b is similar to the datasheet 70 in FIG. 4a with the exception that the datasheet 80 further contains a fourth column 84, which represents the user identifier for identifying different users. Accordingly, the transactions between different users and one provider can be distinguished from each other through the user providers contained in the provider requests. Furthermore, in some examples, the transaction information, the provider identifier and the user request contained in one provider request may indicate the relationship between the provider and the user during the transaction. For example, the transaction information "$10.00 has been paid" and the associated user identifier "UID003" and provider identifier "PID002" indicate that a payment amount of $10.00 has been paid from the user "UID003" to the provider "PID002". This type of provider request can serve as a receipt of payment. When the user asks the provider to provide a commodity or service that has already been paid, the transaction server 40 may search for the corresponding provider request through the provider identifier and user identifier commonly contained in the provider request and the user request to confirm the payment.

As shown in FIG. 4c, the datasheet 90 in FIG. 4c is similar to the datasheet 80 in FIG. 4b with the exception that the datasheet 90 further contains a fifth column 95, which represents the location of the provider. In practical applications, the user request sent to the transaction server may also comprise location information, which may be obtained from the tag or the user device. The location information contained in the user request may be compared with the location of the provider to determine if the transaction is allowed.

Figure 5:
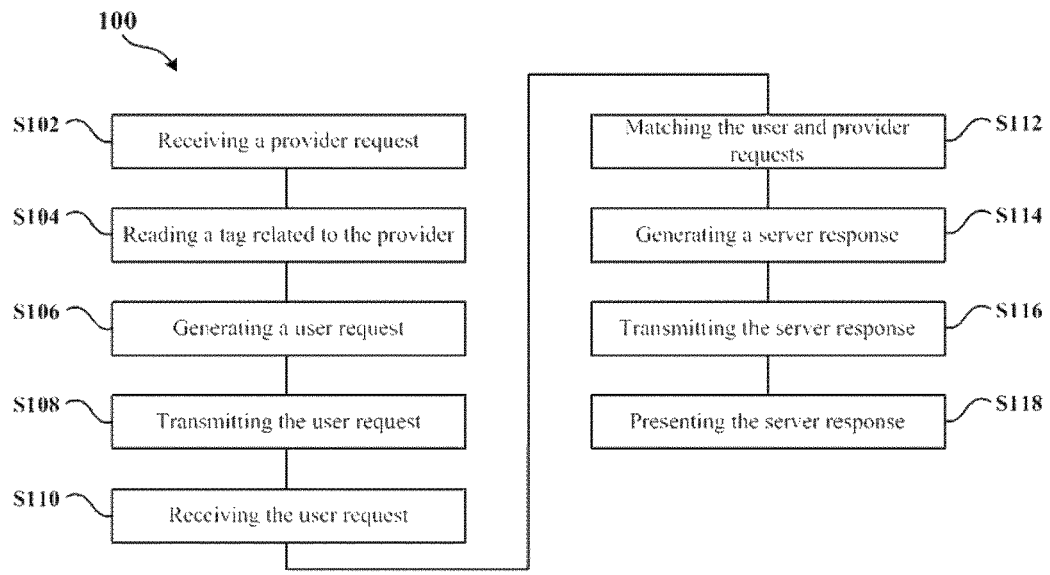
FIG. 5 shows a flowchart of a transaction processing method according to an embodiment of the present disclosure.

FIG. 5 shows a flowchart of a transaction processing method 100 according to an embodiment of the present disclosure. By implementing the method 100, a provider and a user can conduct a transaction therebetween. The transaction processing method 100 may be in the form of a program of instructions executable by a computer and stored within a computer readable storage medium. Hereinafter, the transaction processing method 100 will be elaborated with reference to FIGS. 1 and 5.

As shown in FIGS. 1 and 5, the transaction processing method 100 begins with the transaction server 40 receiving a provider request containing transaction information and a provider identifier associated with a provider at S102. The provider may use his or her provider device 50 to generate the provider request indicating his or her intention to initiate the transaction. In certain embodiments, the provider request may be dynamically sent to the transaction server 40 by the provider. For example, after the provider and the user reach agreement on the transaction, the provider may control his or her provider device to generate the provider request according to the agreement and then send the provider request to the transaction server 40. In some other examples, the provider request may include transaction information that the provider unilaterally wants to show to the user, such as text, image, video or audio data. Then the user may choose whether or not to respond to such provider request or how to respond upon receipt of the transaction information. For example, the provider may send an advertisement or price information of his or her commodities and/or services to the transaction server 40. Then the user may make further choice, acceptance or cancellation upon receipt of the transaction information.

In certain embodiments, the provider may conduct the transaction with only one user. In this case, the transaction server 40 may not process the provider request until receiving a user request associated with the provider. In some other embodiments, the provider may concurrently conduct transactions with different users. In this case, apart from the provider identifier, the provider request may further contain the user identifier associated with the user for the transaction to identify the correct or desired transaction counterparty (see the request datasheet in FIGS. 4*b* and 4*c*).

At S104, the tag 20 associated with the provider is read via the user device 30 to obtain the provider identifier associated with the provider. For example, the user may carry the user device 30 to approach the tag 20, such that the tag reader of the user device 30 is allowed to set up a connection to the tag 20. Then the tag reader may request data, such as the provider identifier, from the tag 20 via the connection between. In certain embodiments, the provider identifier may be a serial code identifiable by the transaction server 40. The user device 30 also obtains the user identifier associated with the user, which is, for example, stored within the user device 30 or inputted into the user device 30. At S106, based on the provider identifier and the user identifier, the user device 30 generates the user request that indicates the user's intention to proceed with the transaction with the provider. Afterwards, the user device 30 transmits the user request to the transaction server 40 at S108.

At S110, the transaction server 40 receives the user request sent from the user device 30. In response to the user request, the transaction server 40 searches in the request database to match the user request with the pre-stored provider request through the common provider identifier at S112. As the requests from the two parties involved in the transaction are mated with each other, the transaction server 40 can continue to conduct the transaction. For example, the transaction server 40 may conduct the transaction according to the transaction information contained in the provider request. In certain embodiments, the transaction server 40 may internally process the transaction if all the information required by the transaction has already stored or obtained in the transaction server 40. In certain embodiments, the transaction server 40 may process the transaction with the external application server 60. Under such condition, after matching the user request and the provider request at S112, the transaction server 40 may generate a transaction request according to the transaction information and other information relevant to the provider and user, and transmit the transaction request to the external application server 60 for conducting the transaction between the provider and the user. The application server 60 may continue to complete the transaction in response to the transaction request. Accordingly, the server 60 may generate a transaction response indicating whether or not the transaction is completed, and feed back the transaction response to the transaction server 40.

Afterwards, at S114, the transaction server 40 may generate a server response indicating the status of the transaction. For example, the server response may indicate whether or not the transaction is completed or when the transaction is completed. The server response may be generated according to the internal processing of the transaction, or according to the transaction response sent by the external application server 60. Then the transaction server 40 may transmit the server response to the corresponding product device and/or user device at S116.

At S118, the user device 30 may present the server response to the user upon receipt of the server response, to inform the status of the transaction. For example, the user device 30 may include a display module for presenting the server response visually, or a speaker for presenting the server response audibly. Similarly, the provider device 50 may also present the server response to the provider. In certain embodiments, the content of the transaction response presented to the provider may be different from that presented to the user.

From the foregoing, the transaction processing method 100 is jointly implemented on the provider device 50, the user device 30 and the transaction server 40. The provider and the user can provide the transaction-required information on his or her own devices, which significantly reduces the risk of transaction fraud. Besides, as the provider just needs to deploy tags in places where the potential users may appear, the expensive POS machines or ATM machines may be unnecessary. Furthermore, the method 100 is convenient and easy to the user as he or she only has to take few actions to conduct the transaction and does not need to input any provider information.

Figure 6:
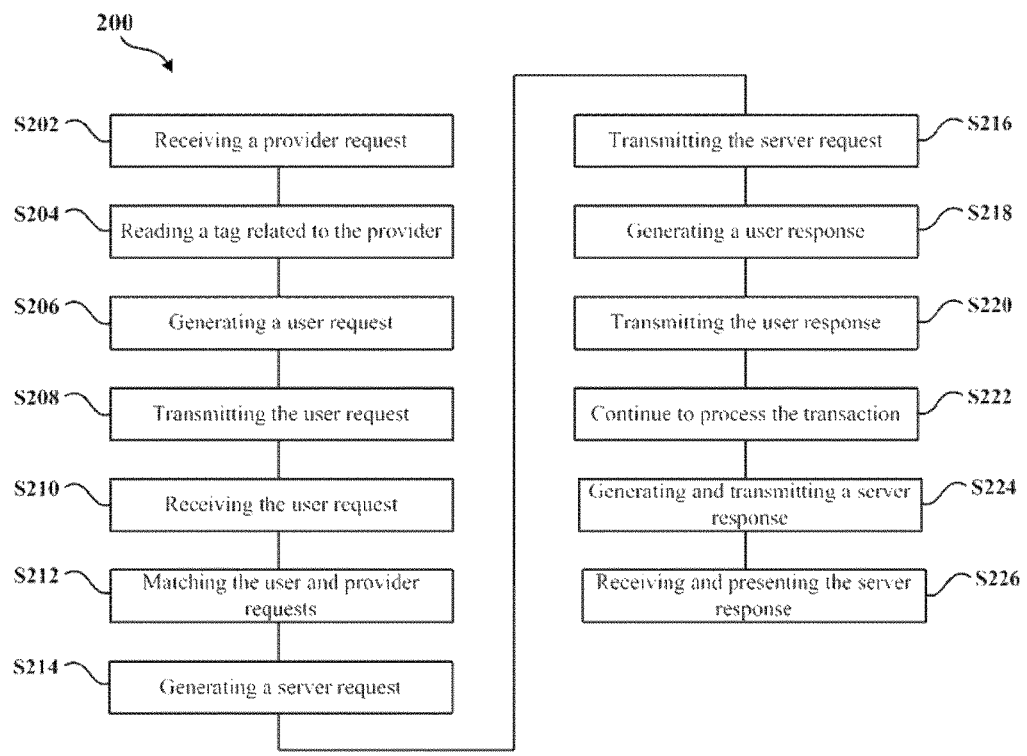
FIG. 6 shows a flowchart of a transaction processing method according to an embodiment of the present disclosure.

In the embodiments described with reference to FIG. 5, the transaction parties generally agree the transaction information, and no other information is needed to be provided by the user. In certain embodiments, the user may need to take some actions during the transaction process, such as taking an action via the user device to indicate acceptance of the transaction, cancellation of the transaction or revision of the transaction information or the like. FIG. 6 shows a flowchart of a transaction processing method 200 according to an embodiment of the present disclosure. The transaction processing method 200 may be in the form of a program of instructions executable by a computer and stored within a computer readable storage medium. Hereinafter, the transaction processing method 200 will be elaborated with reference to FIGS. 1 and 6.

As shown in FIGS. 1 and 6, the transaction processing method 200 begins with the transaction server 40 receiving a provider request containing transaction information and a provider identifier associated with a provider at S202. At S204, the tag 20 associated with the provider is read via the user device 30 to obtain the provider identifier associated with the provider. The user device 30 also obtains the user identifier associated with the user, which is, for example, stored within the user device 30 or inputted into the user device 30. At S206, based on the provider identifier and the user identifier, the user device 30 generates the user request that indicates the user's intention to proceed with the transaction with the provider. Afterwards, the user device 30 transmits the user request to the transaction server 40 at S208.

At S210, the transaction server 40 receives the user request sent from the user device 30. In response to the user request, the transaction server 40 searches in the request database to match the user request with the pre-stored provider request through the common provider identifier at S212. After the matching of the user request and the provider request, the transaction server 40 generates a server request containing the transaction information at S214 and transmits the server request to the user device 30 at S216.

In certain embodiments, the server request may contain a plurality of candidate choices for the user to choose from, or prompt information for the user to accept the transaction, to cancel the transaction or to revise the transaction information. In certain embodiments, the prompt information the prompt information contains a financial account associated with the user. Such information may be included within the transaction information, or provided by the transaction server 40 according to the transaction information, the provider identifier and/or the user identifier. For example, the transaction information contained in the server request may contain a plurality of candidate choices of commodities or services. The transaction server 40 may forward such transaction information to the user device 30 via the server request. In answer to the server request, the user may make one or more choices via the user device 30 according to his or her personal intention, such that a user response including the choice(s) is generated at S218. In some other examples, the transaction server 40 may store information about the user's financial accounts. The transaction server 40 may search for the user financial account information according to the user identifier. Then the user account information including a plurality of candidate account choices may be included within the server request. In answer to the server request, the user may choose via the user device 30 one financial account from the plurality of candidate account choices for the transaction, to generate a user response including the chosen financial account at S218.

In some cases, the server request may contain prompt information informing the user whether or not to agree on the transaction information, i.e. whether or not to accept the transaction, or whether or not to revise the transaction information. If the user is not satisfied with the transaction, he or she may choose to cancel the transaction by taking corresponding actions. Alternatively, the user may choose to revise the transaction information by providing what he or she favors. Then the user response will include information indicating the corresponding user actions, such as acceptance of the transaction, cancellation of the transaction or revision of the transaction information.

Furthermore, the user may also provide additional information to be included in the user response via the user device 30 in answer to the server request. For example, the user may input the personal identifying information (PIN) for verification of his or her user account in the transaction server 40 or in the application server 60. And the transaction server 40 or the application server 60 may verify if the PIN is in conformity with the user account to determine whether or not to proceed with the transaction.

At S220, the user device 30 transmits the user response to the transaction server 40. Upon receipt of the user response, the transaction server 40 continues to process the transaction at S222, internally or by using external application server 60. Afterwards, the transaction server 40 may generate a server response indicating the status of the transaction and transmit the server response to the user device and/or the provider device at S224. At S226, the user device 30 may present the server response to the user upon receipt of the server response, to inform the status of the transaction. Similarly, the provider device 50 may also present the server response to the provider.

From the foregoing, during the process of the method 200, the user may have chance to choose whether or not to proceed with the transaction and how to proceed with the transaction, which provides a convenient and flexible mechanism for a user to conduct transaction with a commodity or service provider.

The transaction processing method according to the embodiments of the present disclosure is applicable in various scenarios, such as payment processing, service or commodity ordering, or payment verification.

Figure 7:
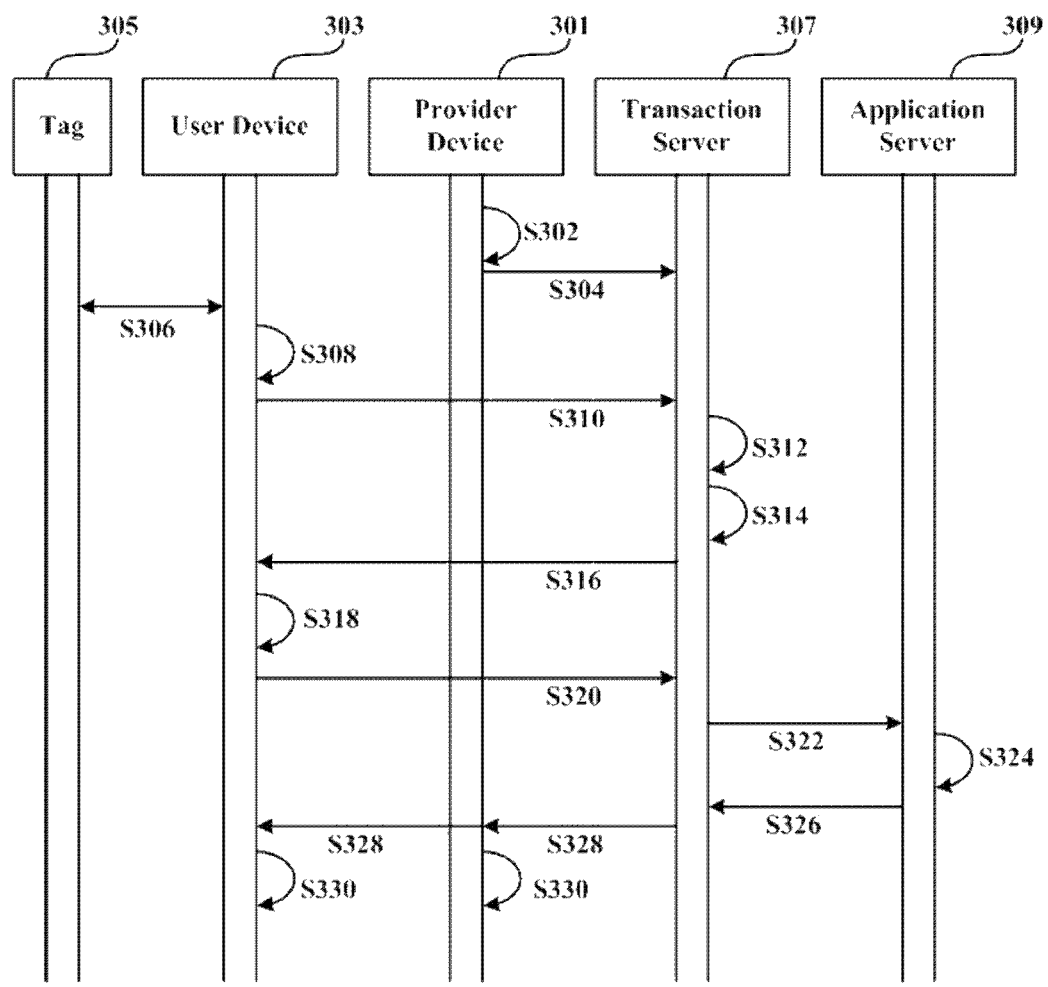
FIG. 7 is a time sequence diagram illustrating a transaction processing method applied in a fund-transferring scenario.

FIG. 7 is a time sequence diagram illustrating a transaction processing method applied in a fund-transferring scenario where a user decides to pay an amount of payment to a provider such as a merchant, or the user decides to receive an amount of refundment from the provider.

As shown in FIG. 7, the scenario comprises a provider device 301, a user device 303, a tag 305, a transaction server 307 and a bank server 309. The bank server 309 is communicatively coupled to the transaction server 307 and stores financial account information. The tag 305 may be disposed on a POS machine, an ATM machine, a package of a commodity, a menu, or any other suitable places where the user may need to pay for the amount of payment.

When the user decides to pay the amount of payment to the provider for purchasing a commodity or service, the provider may generate a provider request via the provider device 301 at S302. The provider request contains the amount of payment to be paid by the user as the transaction information, and a provider identifier associated with the provider. The amount of payment may be manually inputted by the provider by using a keyboard or the like. Alternatively, the amount of payment may be obtained by scanning a bar code associated with the commodity or service, such as the bar code printed on the package of the commodity. In some examples, the description of the commodity or service, such as its name or brief introduction, may be also contained in the provider request and act as a portion of the transaction information.

At S304, the provider device 301 transmits the provider request to the transaction server 307. At S306, the user device 303 reads the tag 305 to obtain the provider identifier. At S308, the user device 303 generates a user request according to the provider identifier and a user identifier associated with the user. At S310, the user device 303 transmits the user request to the transaction server 307. At S312, the transaction server 307 matches the provider request and the user request through the provider identifier, such that the transaction server 307 knows that the amount of payment needs to be paid from the user to the provider. At S314, the transaction server 307 obtains the provider and user's financial account information, which may be pre-stored within the transaction server 307 or may be otherwise obtained through the provider identifier and the user identifier. Then the transaction server 307 generates a server request containing the amount of payment and the user's financial account information. At S316, the transaction server 307 transmits the server request to the user device 303.

At S318, the user device 303 generates a user response in answer to the server request. As described above, the financial account information may comprise one user account or multiple user accounts. When the financial account information comprises one user account, the user may respond to the server request by choosing to accept the transaction. When the financial account information comprises multiple user accounts, the user may respond to the server request by choosing one account from the multiple user accounts. The user selection of the account also indicates that the user wants to proceed with the transaction. In certain examples, the user may input his or her personal identifying information via the user device, which may be included within the user response as well.

At S320, the user device 303 transmits the user response to the transaction server 307. At S322, the transaction server 307 identifies the bank server 309 according to the user account and the provider account, and then transmits a transaction request including the amount of payment and the account information to the bank server 309. At S324, the bank server 309 may process the transaction based on the transaction request, such that funds corresponding to the amount of payment may be transferred from the user account to the provider account. In the cases where the user response includes the PIN, the bank server 309 may verify if the PIN is in conformity with the user account to determine whether or not to proceed with the transaction. In certain examples, the user account may not have sufficient funds to pay for the amount of payment. In that case, the bank server 309 may complete the transaction by generating a server response indicating failure of payment. At S326, the bank server 309 transmits the server response to the transaction server 307. At S328, the transaction server 307 generates a server response informing the status of the transaction, and transmits the server response to the user device 303 and/or the provider device 301. At 330, the user device 303 presents the server response to the user.

Figure 8:
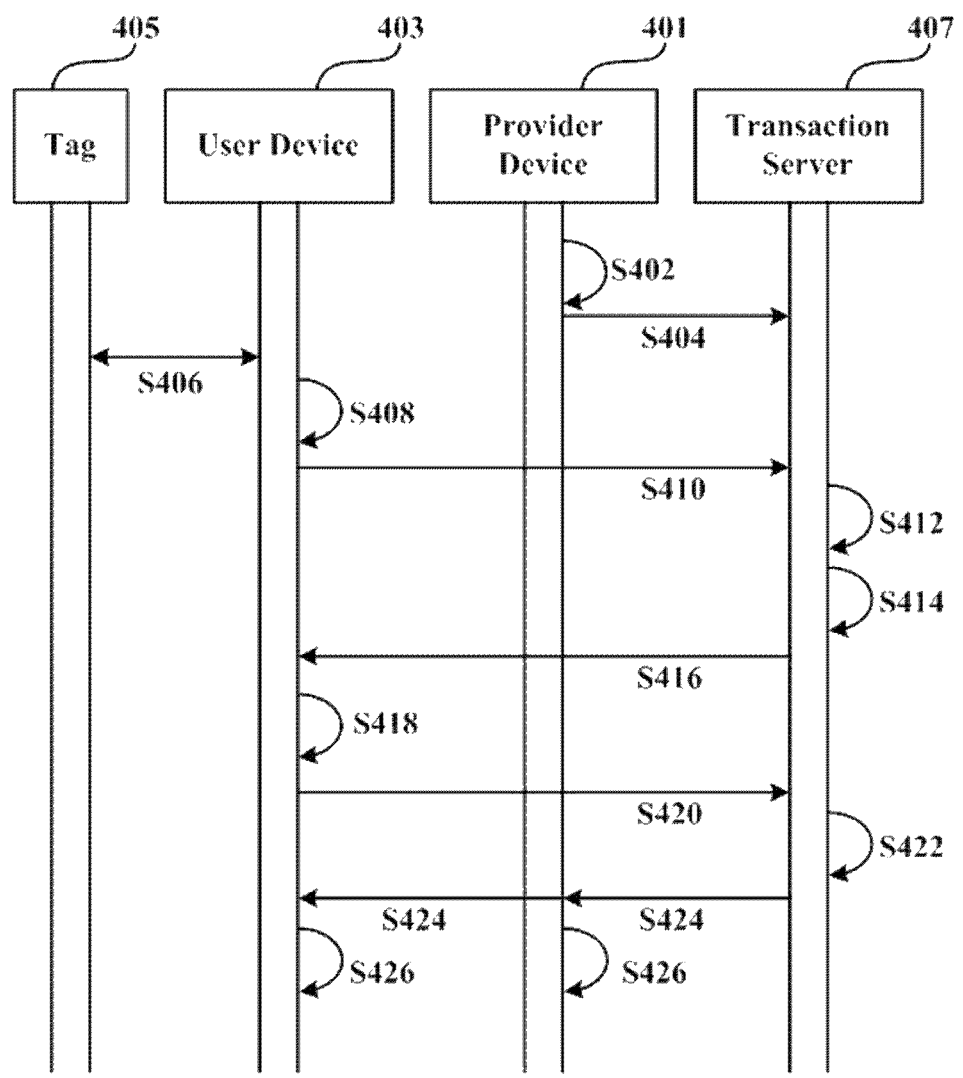
FIG. 8 is a time sequence diagram illustrating a transaction processing method applied in a scenario where a user decides to order a commodity or service provided by a provider.

FIG. 8 is a time sequence diagram illustrating a transaction processing method applied in a scenario where a user decides to order a commodity or service provided by a provider.

As shown in FIG. 8, the scenario comprises a provider device 401, a user device 403, a tag 405 and a transaction server 407. When the provider decides to advertise or show his or her commodities or services to the user, the provider may generate a provider request via the provider device 401 at S402. The provider request contains the commodity information or service information that the provider wants to show to the user.

At S404, the provider device 401 transmits the provider request to the transaction server 407. At S406, the user device 403 reads the tag 405 to obtain the provider identifier. At S408, the user device 403 generates a user request according to the provider identifier and a user identifier associated with the user. At S410, the user device 403 transmits the user request to the transaction server 407. At S412, the transaction server 407 matches the provider request and the user request through the provider identifier, such that the transaction server 407 knows where the transaction information could be sent to. At S414, the transaction server 407 generates a server request containing transaction information. At S416, the transaction server 407 transmits the server request to the user device 403.

At S418, the user device 403 generates a user response in answer to the server request by taking a user action regarding the transaction information. For example, the user may choose one candidate choice from the commodity information, or choose not to select any of the candidate choices. At S420, the user device 403 transmits the user response to the transaction server 407. At S422, the transaction server 407 may complete the transaction according to the user response. For example, the transaction server 407 may generate a server response indicating a commodity or service provided by the provider is ordered by the user. Then at S424, the transaction server 409 transmits the server response to the user device 403 and/or the provider device 401. At S426, the user device 403 presents the server response to the user; and the provider device 401 presents the server response to the provider.

Figure 9:
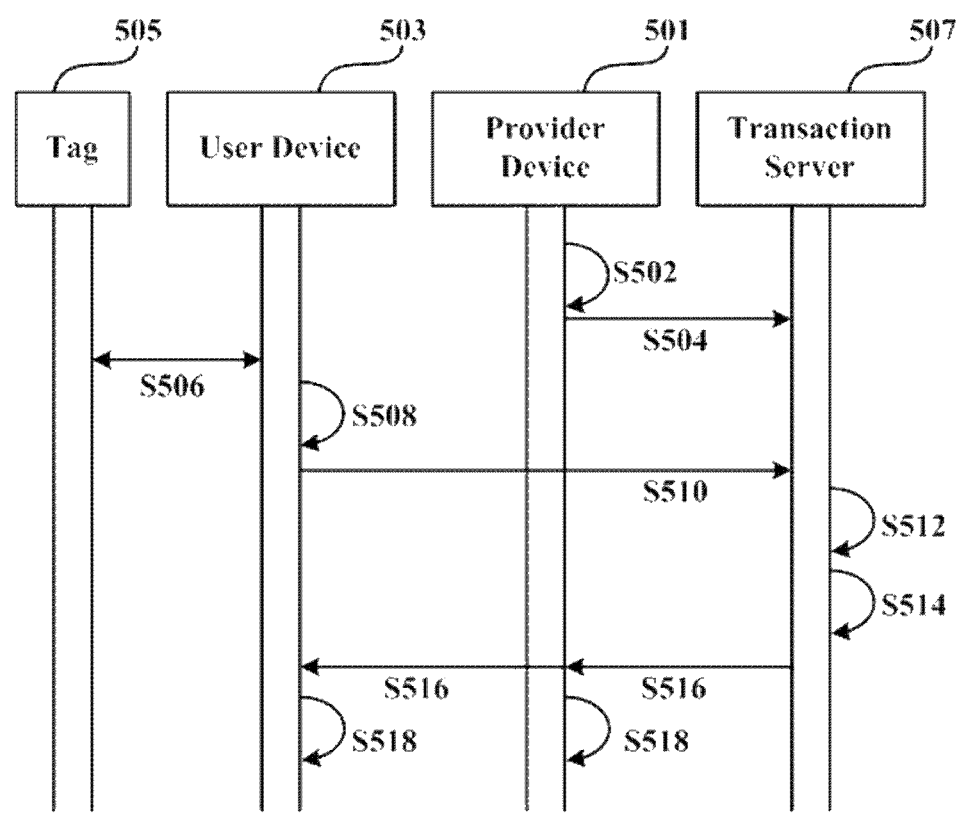
FIG. 9 is a time sequence diagram illustrating a transaction processing method applied in a scenario where a user wants to exchange a commodity or service of a provider that has been paid from the user to provider.

FIG. 9 is a time sequence diagram illustrating a transaction processing method applied in a scenario where a user wants to exchange a commodity or service of a provider that has been paid from the user to provider. The transaction processing method may be used to verify whether or not the user has paid for the commodity or service.

As shown in FIG. 9, the scenario comprises a provider device 501, a user device 503, a tag 505 and a transaction server 507. When the provider wants to exchange the commodity or service provided by the provider, the provider may generate a provider request via the provider device 501 at S502. The provider request contains the commodity and service information (i.e. the transaction information), a user identifier associated with the user and a provider identifier associated with the provider. The provider request indicates that the commodity or service has been paid by the user. The payment may be conducted by any suitable ways, such as mobile payment, online payment or conventional offline payment.

At S504, the provider device 501 transmits the provider request to the transaction server 507. At S506, the user device 503 reads the tag 505 to obtain the provider identifier. At S508, the user device 503 generates a user request according to the provider identifier and a user identifier associated with the user. At S510, the user device 503 transmits the user request to the transaction server 507. At S512, the transaction server 507 matches the provider request and the user request through the common provider identifier and the user identifier, such that the transaction server 507 knows the user sending the user request has paid the payment. At S514, the transaction server 507 generates a server response indicating the status of the transaction, i.e. indicating whether the verification of the user is successfully conducted. At S516, the transaction server 507 transmits the server response to the user device 503 and/or the provide device 501. At S518, the user device 503 presents the server response to the user to inform the status of the transaction. Also at S518, the provider device 503 presents the server response to the provider to inform the status of the transaction. If the user is successfully verified, the provider may provide the commodity or service to user.

The embodiments of the present disclosure may be implemented by hardware, software or any combination thereof. The hardware may be implemented by specific logic circuits, and the software may be stored in a memory and executed by appropriate instruction executing systems. For example, the software may be executed by a microprocessor or a specifically designed hardware. Those skilled in the art may understand that the previous method of the present disclosure may be implemented by computer-executable instructions and/or control codes contained in the processor. For example, such codes may be provided in storage mediums such as hard disks, CD(s), DVD-ROM(s), programmable memories such as ROM(s), or data mediums such as optical or electrical signal mediums.

It should be noted that, although several modules or sub-modules of the system have been described in the previous paragraphs, such division is not mandatory. The functions and features of two or more modules described above may be embodied in a module. Otherwise, the function and feature of one module described above may be embodied in two or more modules.

Furthermore, although the operation of a method according to the present disclosure is illustrated with reference to the accompanying drawings in a specific sequence, the present disclosure may be practiced using process flows that differ from that illustrated. Additionally, it should be noted that not all steps are required in every embodiment. In other words, one or more of the steps may be omitted or replaced, without departing from the spirit and scope of the invention. In certain embodiments, steps may be performed in different order, in parallel with one another, or omitted entirely, and/or certain additional steps may be performed without departing from the scope of the present disclosure.

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope. The scope and spirit of the disclosure is defined by the appended claims.

What is claimed is:

1. A method of electronically processing a transaction using a user device remotely communicated with a transaction server, the method comprising:
    obtaining a provider identifier associated with a provider for the transaction by reading a tag disposed in a position associated with the provider, wherein the tag stores the provider identifier and enables a short-range wireless communication with the user device through a radio wave field, and wherein the user device comprises a tag reader for reading the provider identifier from the tag and a remote communication module for communicating with the transaction server;
    generating via the user device a user request containing the provider identifier, location information of the provider, and a user identifier associated with a user of the user device;
    transmitting the user request to the transaction server, wherein the transaction server is configured to store a request database which comprises multiple provider requests received from a provider device of the provider and receipt times of the multiple provider requests, wherein the multiple provider requests comprise at least a provider request containing the provider identifier, the location information of the provider, and transaction information, and
        wherein the transaction server is configured to, when receiving the user request, match the user request with the provider request among the multiple provider requests based on the provider identifier, the location information of the provider and the receipt times of the multiple provider requests;
    receiving from the transaction server a server request containing the transaction information after the transaction server matches the user request with the provider request;
    generating a user response to the server request by taking a user action via the user device regarding the transaction information; and
    transmitting the user response to the transaction server to complete the transaction between the user and the provider, wherein the transaction server
        transmits a transaction request containing the transaction information and information related to the provider and the user to an application server for conducting the transaction between the user and the provider, and
        receives a transaction response indicating whether or not the transaction is completed from the application server.

2. The method of claim 1, further comprising:
    receiving a server response informing the status of the transaction, wherein the server response is generated via the transaction server by matching the user request and the provider request through the provider identifier; and
    presenting the server response via the user device.

3. The method of claim 1, wherein the server request contains a plurality of candidate choices for the user to choose from, or prompt information for the user to accept the transaction, cancel the transaction or revise the transaction information.

4. The method of claim 3, wherein the plurality of candidate choices comprise a plurality of candidate financial accounts associated with the user.

5. The method of claim 3, wherein the prompt information comprises a financial account associated with the user.

6. The method of claim 1, wherein the user action comprises acceptance of the transaction, cancellation of the transaction or revision of the transaction information.

7. The method of claim 1, wherein the user response comprises personal identifying information associated with the user.

8. The method of claim 1, wherein the transaction information comprises an amount of payment to be paid from the user to the provider, or an amount of refundment to be transferred from the provider to the user.

9. The method of claim 1, wherein the provider request is dynamically provided by the provider.

10. The method of claim 1, wherein the provider request further comprises the user identifier, and the transaction information contains a payment that has been paid from the user to the provider.

11. The method of claim 10, further comprising:
    receiving a server response informing the status of the transaction, wherein the server response is generated via the transaction server by matching the user request and the provider request through the provider identifier and the user identifier; and
    presenting the server response via the user device.

12. The method of claim 1, wherein the tag is disposed on a POS machine, an ATM machine, an ID card, a financial card, a table, a package of a commodity, a shelf, a catalog or a menu associated with the provider.

13. A method of electronically processing a transaction using a user device remotely communicated with a transaction server, the method comprising:
    receiving from a provider device multiple provider requests comprising at least a provider request containing transaction information, a provider identifier associated with a provider for the transaction, and location information of the provider,
        wherein the provider identifier is obtained by reading a tag disposed in a position associated with the provider, wherein the tag stores the provider identifier and enables a short-range wireless communication with the user device through a radio wave field, and wherein the user device comprises a tag reader for reading the provider identifier from the tag and a remote communication module for communicating with the transaction server;

storing the multiple provider requests and receipt times of the multiple provider requests in a request database;

receiving a user request from a user device, wherein the user request contains the provider identifier, location information of the provider, and a user identifier associated with a user of the user device; and searching the request database to match the user request with the provider request based on the provider identifier, the location information of the provider and the receipt times of the multiple provider requests;

generating a server request containing the transaction information after the matching of the user request and the provider request;

transmitting the server request to the user device;

receiving a user response in answer to the server request to complete the transaction between the user and the provider, wherein the user response is generated via the user device by taking a user action by the user regarding the transaction information;

transmitting a transaction request containing the transaction information and information related to the provider and the user to an application server for conducting the transaction between the user and the provider; and receiving a transaction response indicating whether or not the transaction is completed from the application server.

14. The method of claim 13, further comprising:

generating a server response indicating the status of the transaction; and transmitting the server response to the user device and/or a provider device associated with the provider.

15. The method of claim 13, wherein the server request further contains a plurality of candidate choices for the user to choose from, or prompt information for the user to accept the transaction, cancel the transaction or revise the transaction information.

16. The method of claim 15, wherein the plurality of candidate choices comprise a plurality of candidate financial accounts associated with the user.

17. The method of claim 15, wherein the prompt information comprises a financial account associated with the user.

18. The method of claim 13, wherein the user action comprises acceptance of the transaction, cancellation of the transaction or revision of the transaction information.

19. The method of claim 13, wherein the user response comprises personal identifying information associated with the user.

20. The method of claim 13, wherein the transaction information comprises an amount of payment to be paid from the user to the provider, or an amount of refundment to be refunded from the provider to the user.

21. The method of claim 13, wherein the provider request is dynamically provided by the provider.

22. The method of claim 13, wherein the provider request further comprises the user identifier, and the transaction information contains a payment that has been paid from the user to the provider.

23. The method of claim 22, wherein the step of matching the user request with the provider request further comprises matching the user request with the provider request through the provider identifier and the user identifier.

24. The method of claim 13, wherein the tag is disposed on a POS machine, an ATM machine, an ID card, a table, a financial card, a table, a package of commodity, a shelf, a catalog or a menu associated with the provider.

25. A computer readable storage medium for storing a program of instructions executable by a computer to perform a process, the process comprising:

obtaining a provider identifier associated with a provider for the transaction by reading a tag disposed in a position associated with the provider, wherein the tag stores the provider identifier and enables a short-range wireless communication with the user device through a radio wave field, and wherein the user device comprises a tag reader for reading the provider identifier from the tag and a remote communication module for communicating with the transaction server;

generating via the user device a user request containing the provider identifier, location information of the provider, and a user identifier associated with a user of the user device;

transmitting the user request to the transaction server,
wherein the transaction server is configured to store a request database which comprises multiple provider requests received from a provider device of the provider and receipt times of the multiple provider requests, wherein the multiple provider requests comprise at least a provider request containing the provider identifier, the location information of the provider, and transaction information, and wherein the transaction server is configured to, when receiving the user request, match the user request with the provider request among the multiple provider requests based on the provider identifier, the location information of the provider and the receipt times of the multiple provider requests;

receiving from the transaction server a server request containing the transaction information after the transaction server matches the user request with the provider request;

generating a user response to the server request by taking a user action via the user device regarding the transaction information; and transmitting the user response to the transaction server to complete the transaction between the user and the provider, wherein the transaction server transmits a transaction request containing the transaction information and information related to the provider and the user to an application server for conducting the transaction between the user and the provider, and receives a transaction response indicating whether or not the transaction is completed from the application server.

26. A computer readable storage medium for storing a program of instructions executable by a computer to perform a process, the process comprising:

receiving from a provider device multiple provider requests comprising at least a provider request containing transaction information, a provider identifier associated with a provider for the transaction, and location information of the provider, wherein the provider identifier is obtained by reading a tag disposed in a position associated with the provider, wherein the tag stores the provider identifier and enables a short-range wireless communication with the user device through a radio wave field, and wherein the user device comprises a tag reader for reading the provider identifier from the tag and a remote communication module for communicating with the transaction server;

storing the multiple provider requests and receipt times of the multiple provider requests in a request database;

receiving a user request from a user device, wherein the user request contains the provider identifier, location information of the provider, and a user identifier associated with a user of the user device; and searching the request database to match the user request with the provider request based on the provider identifier, the location information of the provider and the receipt times of the multiple provider requests;

generating a server request containing the transaction information after the matching of the user request and the provider request;

transmitting the server request to the user device;

receiving a user response in answer to the server request to complete the transaction between the user and the provider, wherein the user response is generated via the user device by taking a user action by the user regarding the transaction information;

transmitting a transaction request containing the transaction information and information related to the provider and the user to an application server for conducting the transaction between the user and the provider; and receiving a transaction response indicating whether or not the transaction is completed from the application server.

* * * * *